July 5, 1960 H. T. PARIGINI 2,943,789

DISC COMPUTER

Filed July 26, 1957 2 Sheets-Sheet 1

INVENTOR.
HARRY T. PARIGINI

BY Mellin and Hanscom

ATTORNEYS

DISC COMPUTER

Filed July 26, 1957 2 Sheets-Sheet 2

INVENTOR.
HARRY T. PARIGINI
BY Mellin and Hanscom
ATTORNEYS

United States Patent Office 2,943,789

Patented July 5, 1960

2,943,789

DISC COMPUTER

Harry T. Parigini, Sacramento, Calif.
(1822 Lawndale Ave., San Leandro, Calif.)

Filed July 26, 1957, Ser. No. 674,414

1 Claim. (Cl. 235—88)

Figure 1:
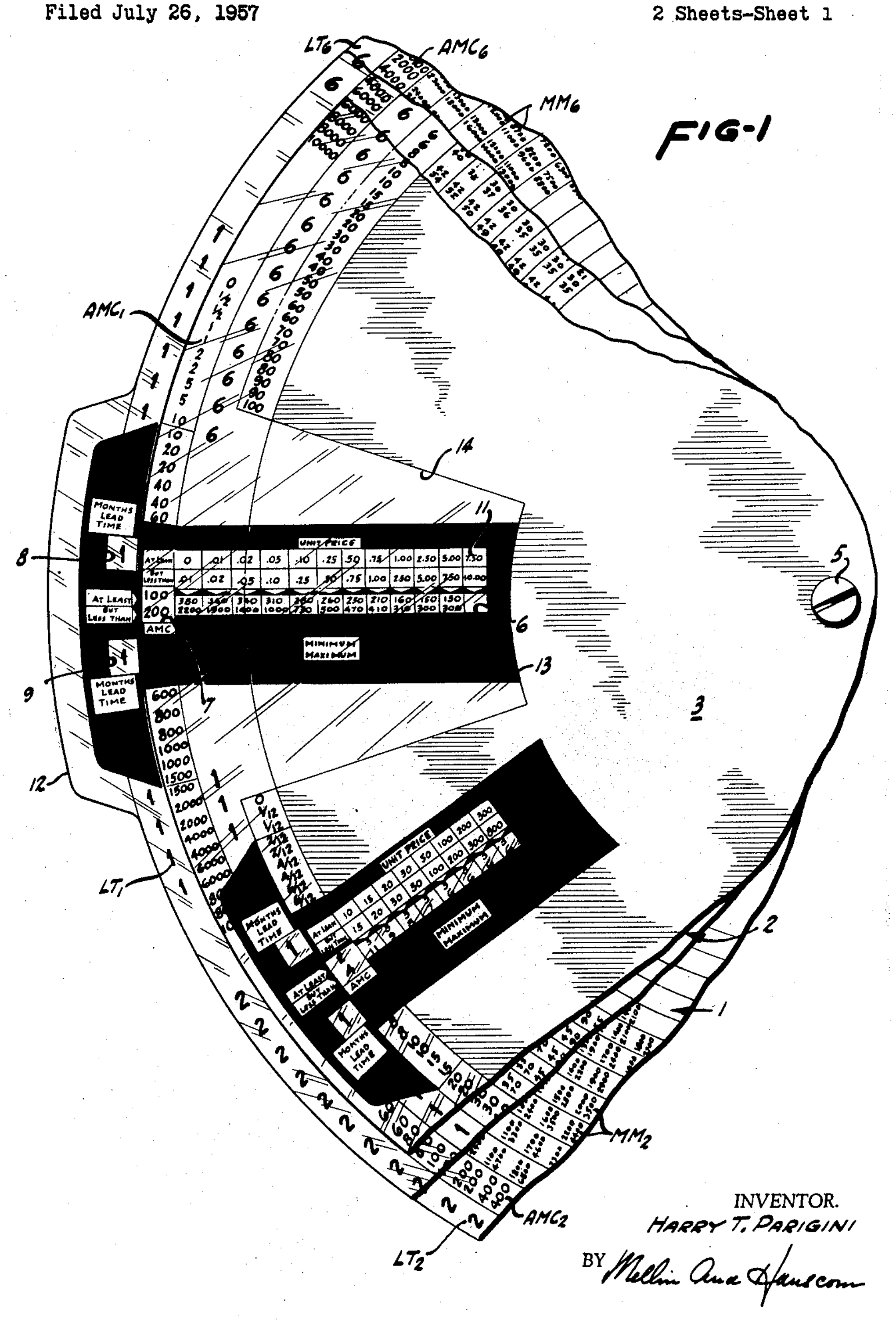

This invention relates to and in general has for its object the provision of a disc type of computer for determining the number or quantity of any given item which should be ordered each month, depending on the time required to fill such order, the unit cost of the item in question, and its average monthly consumption.

To maintain a proper inventory of parts and supplies, large manufacturing and maintenance concerns are required each month to place orders for an infinite variety of items in various quantities. The quantity of each item so ordered depends upon the rate at which it is consumed, its cost, and the length of time required to fill the order. The greater the quantity of each item consumed, the greater must be the quantity of it reordered and, likewise, the greater the time required to fill the order, the greater must be the quantity order. On the other hand, the greater the per unit cost of any item, the smaller should be the quantity of such item placed on reorder. All of these variables depend upon the experience of the particular concern under consideration. The average monthly consumption of any item can be readily calculated from the company records of its actual immediately past annual or quarterly consumption. The average lapse of time required to fill an order of any particular item from any particular manufacturer or distributor is likewise a matter of company record or can be obtained from the vendor as likewise can be obtained the unit cost of any item. Also from the company records can be obtained or calculated the required data as to optimum number of items which should be ordered based on its unit price.

For the purposes of this application, the term "lead time" shall designate the known or estimated lapse of time between the date of placing an order and the date of filling such order.

More specifically, the object of this invention is the provision of a computer including a disc in combination with a sweep arranged for rotation over said disc coaxially therewith, wherein the sweep is provided with one or more lead time windows, and with an average monthly consumption window in radial registration with a radial row of circularly spaced pairs of minimum and maximum windows, said sweep having imprinted thereon in circular alignment with said minimum and maximum windows a series of circularly spaced pairs of radially aligned unit price figures arranged in a mathematical progression; and wherein said disc is provided with a plurality of groups of lead time figures in radial alignment with said lead time windows, all of the figures in any one group being identical, but the figures of each succeeding group being arranged in arithmetic progression; wherein there is imprinted on said disc a plurality of groups of average monthly consumption figures in circular alignment with the average monthly consumption window of said sweep, each group of such figures being arranged in a mathematical progression and there being one such group for each group of said lead time figures; and wherein said disc is provided with a group of radial rows of circularly spaced pairs of minimum and maximum figures in radial and circular alignment with the radial row of the said minimum and maximum windows of the sweep.

A further object of this invention is the provision of a plurality of coaxially mounted cooperating pairs of discs and sweeps wherein the figures associated with each pair of discs and sweeps are an extension of the cooperating figures of the succeeding pair of discs and sweeps and wherein each succeeding sweep is provided with a window through which the data on the preceding sweep can be viewed.

The invention possesses other advantageous features, some of which, with the foregoing, will be set forth at length in the following descripton where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Figure 2:
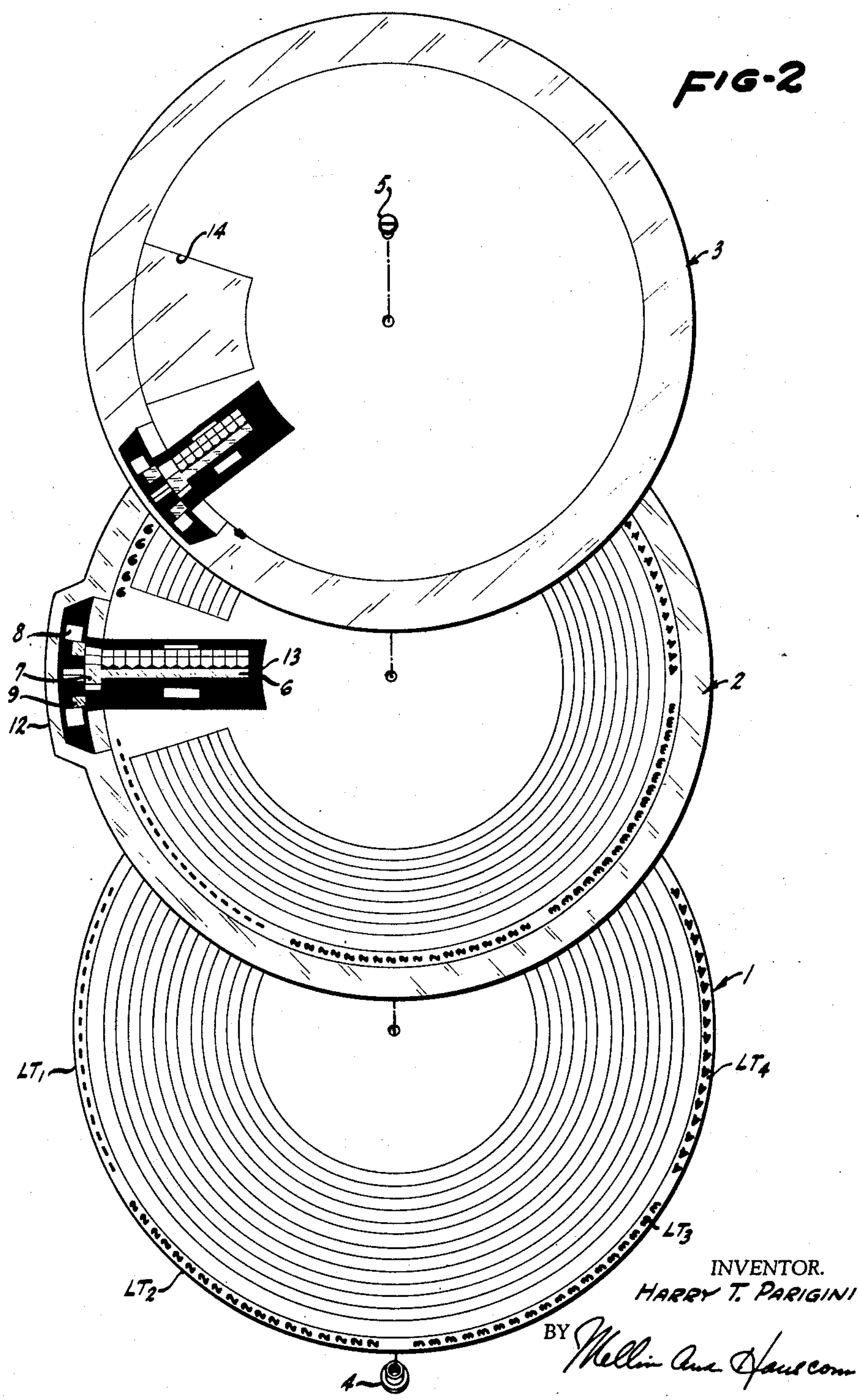

Referring to the drawings:

Fig. 1 is a fragmentary top plan view of a computer embodying the objects of my invention; and Fig. 2 is an exploded view of the computer illustrated in Fig. 1.

The computer as shown in these figures includes three discs 1, 2 and 3, coaxially mounted on a common pin 4 for rotation relative to each other, the stack of discs so formed being held together by a headscrew 5 threaded into the pin 4.

Imprinted along the edge of the lower disc 1 in a circular row are six circularly spaced groups $LT_1$—$LT_6$ of monthly lead time figures. Each of the figures in the first such group of figures is the number 1; each of the figures in the second such group of figures is the number 2, etc., whereby it can be seen that groupwise these figures are arranged in a straight arithmetical progression from 1 to 6. Here it might be noted that, by way of illustration, 21 figures are included in the first group of figures and that each of the other groups of figures contains 18 numbers. Also it should be noted that each such group of numbers is circularly spaced from its two immediately adjacent groups of numbers. The figures in these six circularly aligned groups $LT_1$—$LT_6$ of figures are designated as lead time numbers for, as hereinafter will become more readily apparent, they represent the time (here in months) known to elapse between the date that any particular item is ordered and the date on which the delivery of such order can be expected. Although here, because of applicant's particular experience with the Southern Pacific Company, a range of from 1 month to 6 months lead time has been provided, in other types of operation a different range of lead times might, of course, prove to be desirable in connection with a different type of operation.

Associated with the six groups of numbers $LT_1$–$LT_6$ is a second set of six groups $AMC_1$ to $AMC_6$ (average monthly consumption numbers) arranged in a circular column inwardly of the circular column containing the six groups $LT_1$–$LT_6$ of numbers. The first group of numbers $AMC_1$ is associated with the first group of numbers $LT_1$ and here constitute an empirical mathematical series of numbers in which each such number represents the average monthly consumption of an item to be ordered and delivered within one month. The numbers in group $AMC_1$ range from 0 to 10,000 and occur as follows: 0–½, ½–1, 1–2, 2–5, 5–10, 10–20, 20–40, 40–60, 60–80, 80–100, 100–200, 200–400, 400–600, 600–800, 800–1000, 1000–1500, 1500–2000, 2000–4000, 4000–6000, 6000–8000, 8000–10,000. From this it will be seen that although this series has been referred to as a mathematical progression, no mathematical formula can be derived for representing any term $n$ thereof, in terms of its immediately preceding term. The series is merely an empirical series of generally progressively increasing numbers which, for all practical purposes, represents the quantities in which various items are normally used. If strict mathematical accuracy were here required, an arithmetic series would be preferable, although then a problem of space would be encountered for it would be impossible to place an arithmetic series ranging from 0 to 10,000 around the periphery of a disc of any acceptable diameter. For this reason, a compromise has been resorted to but one which, for all practical purposes, has proved to be quite acceptable.

The group of numbers $AMC_2$ is similarly associated with the group of numbers $LT_2$, the group of numbers $AMC_3$ with the group of numbers $LT_3$, etc. The series of numbers in each of the groups of numbers $AMC_2$ . . . $AMC_6$ can be identical to the series above enumerated and constituting the group of numbers $AMC_1$.

The groups $AMC_1$–$AMC_6$ are therefore arranged in a repetitive pattern in an endless circular column immediately inward of the circular column containing the first set of groups of numbers $LT_1$–$LT_6$.

One other thing should here be noted concerning the relative position of the numbers in the two groups of numbers $LT_1$–$LT_6$ and $AMC_1$–$AMC_6$. From the lower corner of disc 1 as this disc is illustrated in Fig. 1, it will be seen that the numbers in the groups $AMC_1$ are arranged in pairs, each such pair being in straddling, radial alignment with one of the numbers of one of the groups $LT_1$–$LT_6$. More specifically, it will be seen that the pair of numbers 400, 400 of the group $AMC_1$ is in straddling alignment with one of the numbers 2 of the group $LT_2$ and that, similarly, the number 2 of the group $LT_2$ is straddled by the pair of numbers 200, 200 of the group $AMC_1$. The reason for this will presently appear in connection with the description of the construction and operation of disc 2.

Disposed radially inwardly of each associated pair of groups of numbers $LT_1$, $AMC_1$; $LT_2$, $AMC_2$, etc. is a third set of groups of numbers $MM_1$ to $MM_6$, the notations MM here being used to indicate the range (minimum and maximum) of the quantity of any item which should be ordered depending upon the lead time involved, the range of cost of the item, and its predetermined or known monthly consumption. The numbers of the groups $MM_1$–$MM_6$ are therefore the unknown quantities to be solved, or computed by the computer.

As shown in Fig. 1, one radial row of paired numbers of group $MM_1$ appears along the horizontal center line of the disc immediately above the notation "Minimum, Maximum." Also at the right portion of the bottom of Fig. 1 there appear three partial radial rows of paired numbers of group $MM_2$. Provision is made on the disc 1 for twelve circular columns of these paired minimum and maximum figures arranged in twenty-one radial rows. However, this entire sector made up of the twelve columns and twenty-one rows need not necessarily be filled with the paired numbers nor are the paired numbers arranged either in columns or rows in any strict mathematical series in which any given pair or its components can be expressed in terms of its preceding pair or its components. By way of illustration, the first row of these pairs of figures of group $MM_1$ is as follows: The first nine pairs of figures in the first row are each 1 and 4, these nine pairs being followed by three pairs of 1 and 3. In each case the first number of the pair is placed directly over the second number of the pair and preferably the upper number and lower numbers should be of a contrasting color such as red for the upper or minimum number and black for the lower or maximum number. The second row of paired numbers consists of 4—13, 3—12, 3—12, 3—12, 3—12, 2—11, 2—11, 2—11, 2—11, 1—8, 1—7 and 1—6. The third row consists of 7—25, 6—24, 6—24, 5—23, 5—23, 5—23, 4—22, 4—22, 3—18, 3—13, 3—10, 2—8. The particular row of these paired figures appearing along the horizontal center line of disc 1, as illustrated in Fig. 1 and consisting of the paired numbers 380—2200, 360—1900, 340—1400, 310—1000, etc. happens to be the eleventh row of group $MM_1$ and, as illustrated, consists of only eleven pairs of numbers. All of the ten preceding rows contain twelve pairs of numbers and all of the succeeding rows contain one less pair than the preceding row. These pairs of numbers are merely derived from the company records as reflecting the minimum and maximum quantities of an item which should be ordered, based on the lead time required and the cost of the item. As above indicated, the particular figures herein used have been found to be satisfactory in connection with the maintenance operations of the Southern Pacific Company. For other operations, another set of figures would probably be found to be desired.

Extending radially across the disc 2 is a radial window 6 of a width and length sufficient to encompass just one radial row of the pairs of numbers included in one of the groups of numbers $MM_1$–$MM_6$. Merging with the outer end of the window 6 is a substantially square window 7 of a size just sufficient to encompass one vertically disposed pair of numbers of one of the groups of numbers $AMC_1$ to $AMC_6$. As illustrated in Fig. 1, the pair of numbers 100—200 is visible through the window 7, and the radial row of vertically paired numbers 380—2200, 360—1900, 340—1400, etc. is visible through the window 6.

Disposed outwardly of the window 7 and above and below it is a pair of vertically or circularly spaced windows 8 and 9, in peripheral registration with the numbers of the six groups of numbers $LT_1$–$LT_6$. The circular, peripheral or vertical spacing of the windows 8 and 9 is such that they straddle two numbers of the group numbers $LT_1$–$LT_6$ with which they happen to be operatively associated. As shown in Fig. 1, all of the windows 6, 7, 8 and 9 are in registration with the first of the three respective groups of numbers, $MM_1$, $AMC_1$ and $LT_1$.

Imprinted on the disc over the windows 6 and 7 is a unit price schedule 11 labeled as indicated in Fig. 1 as "unit price." The particular schedule here shown consists of twelve vertical pairs of numbers arranged in a radial row. As shown, these pairs of figures are 0—.01, .01—.02, .02—.05, .05—.10, etc., each such pair indicating a price range in dollars. Here it will be seen that each of these paired figures is in vertical registration with one of the paired figures of group $MM_1$.

Imprinted immediately outwardly of the price schedule 11 and in radial alignment with the window 6 is the legend AMC, which, as above indicated, is an abbreviation for "average monthly consumption" and indicates that the window 7 should be placed in registration with that pair of numbers of one of the groups of numbers $AMC_1$–$AMC_6$ which most closely reflects the average monthly consumption of the item under consideration. The particular AMC group selected of course depends upon the lead time involved. As illustrated in Fig. 1, a one month lead time has been assumed and, consequently, the window 7 is in registration with a pair of numbers of group $AMC_1$ and, more particularly, with the pair of numbers 100—200.

Indicated on the disc 1 below the window 6 is the notation "Minimum Maximum," this notation indicating that the range of the quantity of any item to be ordered is to be found in the window 6.

Formed as a radial extension of the disc 2 adjacent the windows 8 and 9 is an operating or finger lug or tab 12 and imprinted thereon and on the disc 2 adjacent each of the windows 8 and 9 is the notation "Months Lead Time," this indicating that either one or both of the windows should be placed in registration with one of the numbers of the proper group $LT_1$–$LT_6$. If the lead time as illustrated in Fig. 1 is assumed to be one month, then the disc 2 is rotated so that the windows 8 and 9 are in registration with group $LT_1$, this being the first operation involved in using the computer as thus far described.

If that portion of the disc 2 containing the price schedule 11 and the various legends above described happens to be transparent, the schedule and legends should be encompassed by a contrasting opaque field 13 which, for practical purposes, and as indicated in the drawings, can be black.

In operating the computer thus far described, the number or quantity of any predetermined item to be ordered is ascertained as follows: The discs 1 and 2 are rotated relative to each other until the windows 8 and 9 of disc 2 are over the proper lead time group of numbers $LT_1$–$LT_6$. If, as will here be assumed, the item involved requires a lead time of only one month, the windows 8 and 9 are made to register general with the numbers of group $LT_1$ (all of which are of course the number 1). This having been done, a finer relative angular adjustment of the two discs is made so as to place the average monthly consumption window 7 into registration with that particular pair of numbers of group $AMC_1$ which includes the known or predetermined average monthly consumption of the item in question. Here it should be noted that in performing the latter operation, it is essential that at least one number of group $LT_2$ be centered in one of the windows 8 or 9. At the ends of any group $LT_1$—$LT_2$ only one of its numbers will appear in one of these windows although at other places thereon a number will appear in each of the windows 8 and 9. This condition is essential for the proper alignment of the various windows of disc 2 with the various rows of figures appearing on disc 1.

When the two discs have been thus aligned, they are held in that position while the operator scans the unit price window to find in price schedule 11 that particular vertical pair of figures containing the known price of the item in question. If it be assumed for purposes of illustration that the price of such item is $2.00, this figure is found to lie between the pair of figures $1.00 and $2.50 The operator then looks through the window 6 immediately below the vertically spaced pair of figures 1.00–2.50 and sees the pair of figures 160 and 310. The first of these figures (160) indicates to the operator that he is to reorder the item in question only if the quantity thereof still in stock is less than 160, and if a reorder is to be made it will be in an amount equal to the difference between 310 and the quantity of the item actually in stock. If the item is out of stock, then the maximum quantity of 310 will be ordered.

It is therefore apparent that the computer of my invention serves to readily determine the quantity of any given item which should be ordered, depending upon three known or predetermined factors: lead time, average monthly consumption, and price.

Here it should be noted that in so far as the operation of disc 1 is concerned, disc 2 operates only as a rotatable support for the windows, price schedule and legends above described, and that for this purpose only a radial strip is required, the remainder of disc 2, at least as so far described, having no function. It is for this reason that the disc 2 can be properly referred to as a sweep, and this term, as herein used, is intended broadly to include either a disc or a fragment or sector thereof.

As a practical matter, it has been found that a computer of the above character having an outer diameter of thirteen or fourteen inches is convenient to handle and store. However, a computer of such a diameter has a limited range and, for this reason, it is an object of this invention to resort to a multiple disc computer wherein the price schedule of an upper disc or sweep is a continuation of the price schedule of a lower or preceding disc and wherein the price schedule of any disc or sweep is correlated with the average monthly consumption figures and lead time figures of the preceding disc.

Preferably, all of the discs used are made of an opaque material or are rendered opaque. However, each succeeding disc must include a transparent window which can be placed in registration with the unit price schedule area of the preceding disc, for otherwise such area would be blanked off.

To that end, disc 3 is provided with a sector shaped window 14 which, as indicated in both Figs. 1 and 2, can be placed in registration with the price schedule area of disc 2.

To extend the range of the computer as above described, the disc 2, in addition to being provided with a price schedule, windows 6, 7, 8 and 9, and with legends therefor, is provided with three groups of figures corresponding in character and location to the groups LT, AMC and MM of disc 1, all this being indicated in Fig. 1.

Disc 3 then serves as a sweep operatively associated with disc 2 in precisely the same manner as the disc 2 serves as a sweep operatively associated with disc 1.

To this end, disc 3 is provided with a price schedule, a minimum maximum window, an average monthly consumption window, and with a pair of lead time windows, all functionally correlated with the groups of figures LT, AMC and MM imprinted on disc 2. However, the price schedule here ranges from $10.00 to $800.00 and the actual figures making up the LT, AMC and MM groups of figures associated with disc 2 are correlated thereto as well as with each other. For this reason the series of figures in these three groups of figures differ somewhat from the series of figures making up the groups $LT_1$–$LT_6$, $AMC_1$–$AMC_6$, and $MM_1$–$MM_6$ associated with disc 1.

Although the computer here illustrated utilizes only three discs, a greater number thereof can, of course, be used.

Basically, my computer can be considered as made up of one or more pairs of units, each including a disc and a cooperating sweep, wherein the disc bears three groups of figures, the first group of figures representing lead time, the second representing average monthly consumption, and the third representing the range of the quantity of any item which should be ordered, and wherein the sweep is provided with a price schedule and with various windows appropriately located for viewing the three groups of figures carried by its associated disc.

I claim:

A computer comprising: a disc; a sweep mounted on said disc coaxially therewith for rotation relative thereto, said sweep being provided with a radial row of windows and with a pair of circularly spaced windows located at one end of said radial row of windows and designated on said sweep as lead time windows, one of said windows of said radial row of windows being designated on said sweep as an average monthly consumption window and the remaining windows of said radial row of windows being designated on said sweep as unit price windows, said sweep being imprinted along said unit price windows with a plurality of pairs of circularly spaced figures arranged in radial rows, each of said pairs of figures indicating a price range, said disc being imprinted with a circular row of lead time figures in radial alignment with the said lead time windows of said sweep, said lead time figures being arranged in a plurality of groups wherein the figures of each group are all identical but are arranged in arithmetic progression from group to group, said disc being imprinted in radial alignment with the said average monthly consumption window of said sweep, with a plurality of groups of average monthly consumption figures, there being one such group for each of said groups of lead time figures, the said average monthly consumption figures of each of said groups being arranged in pairs and in a mathematical progression, said disc having also imprinted thereon a plurality of groups of circularly spaced pairs of radial rows of minimum and maximum figures in radial alignment with the said unit price windows of said sweep, and said latter pairs of figures being arranged in a mathematical progression, there being one such group of minimum and maximum figures for each said group of lead time figures.

References Cited in the file of this patent

UNITED STATES PATENTS 877,230 Roche ---------------- Jan. 21, 1908